United States Patent
Chen et al.

(10) Patent No.: US 12,304,837 B2
(45) Date of Patent: May 20, 2025

(54) WATER TREATMENT COMPOSITION WITH CATALYTIC MATERIAL AND AN OXIDANT AND METHOD OF USE

(71) Applicant: National Cheng Kung University, Tainan (TW)

(72) Inventors: Wei-Hsin Chen, Kaohsiung (TW); Kuan-Ting Lee, Tainan (TW); Kuan-Yu Ho, Tainan (TW); Shuenn-Ren Liou, Tainan (TW)

(73) Assignee: National Cheng Kung University, Tainan (TW)

( * ) Notice: Subject to any disclaimer, the term of this patent is extended or adjusted under 35 U.S.C. 154(b) by 380 days.

(21) Appl. No.: 17/939,945

(22) Filed: Sep. 7, 2022

(65) Prior Publication Data
US 2023/0331596 A1    Oct. 19, 2023

(30) Foreign Application Priority Data
Apr. 15, 2022  (TW) .................. 111114436

(51) Int. Cl.
| | | |
|---|---|---|
| C02F 1/467 | (2023.01) | |
| B01J 21/10 | (2006.01) | |
| B01J 23/889 | (2006.01) | |
| B01J 35/31 | (2024.01) | |
| B01J 35/40 | (2024.01) | |
| B01J 35/61 | (2024.01) | |

(Continued)

(52) U.S. Cl.
CPC ............ *C02F 1/4672* (2013.01); *B01J 21/10* (2013.01); *B01J 23/8892* (2013.01); *B01J 35/31* (2024.01); *B01J 35/40* (2024.01); *B01J 35/612* (2024.01); *C02F 1/725* (2013.01); *C02F 2101/30* (2013.01); *C02F 2201/46165* (2013.01); *C02F 2305/026* (2013.01)

(58) Field of Classification Search
CPC ... B01J 35/31; B01J 35/00; B01J 35/10; B01J 35/02; B01J 21/10; B01J 23/8892; B01J 35/40; B01J 35/612; B01J 2235/00; B01J 35/70; C02F 1/36; C02F 1/46; C02F 1/30; C02F 1/72; C02F 1/4672; C02F 1/725; C02F 2101/30; C02F 2201/46165; C02F 2305/026; C02F 1/722; C02F 1/76; C02F 1/78
See application file for complete search history.

(56) References Cited

U.S. PATENT DOCUMENTS 4,131,526 A * 12/1978 Moeglich .................. C02F 1/46
                                                                  205/753

FOREIGN PATENT DOCUMENTS

| CN | 105585180 | A |   | 5/2016 | |
|---|---|---|---|---|---|
| CN | 106242017 | A | * | 12/2016 | ............. C02F 1/722 |
| CN | 111377522 | A | * | 7/2020 | ............. B01J 23/06 |

(Continued)

OTHER PUBLICATIONS

CN-106242017-A Translation (Year: 2016).*

(Continued)

*Primary Examiner* — Hayden Brewster
(74) *Attorney, Agent, or Firm* — Winston Hsu (57) ABSTRACT

A water treatment composition for treating organic wastewater is provided. The water treatment composition includes a bulk catalytic material and an oxidant. The bulk catalytic material includes iron atoms or ions, manganese atoms or ions, and magnesium atoms or ions.

9 Claims, 9 Drawing Sheets

(51) Int. Cl.
*C02F 1/72* (2023.01)
*C02F 101/30* (2006.01)

(56) References Cited

FOREIGN PATENT DOCUMENTS

| CN | 111871422 A | * | 11/2020 | | |
|---|---|---|---|---|---|
| WO | WO-9708101 A1 | * | 3/1997 | ................ | C02F 1/72 |
| WO | WO-02101912 A1 | * | 12/2002 | ............. | H01L 35/28 |

OTHER PUBLICATIONS

CN-111871422-A (Year: 2020).*
WO-02101912-A1 (Year: 2002).*
WO-9708101-A1 (Year: 1997).*
CN-111377522-A (Year: 2020).*

* cited by examiner

WATER TREATMENT COMPOSITION WITH CATALYTIC MATERIAL AND AN OXIDANT AND METHOD OF USE

BACKGROUND OF THE INVENTION

1. Field of the Invention

The present disclosure relates to a water treatment composition and a water treatment method, and more particularly, to a water treatment composition and a water treatment method for treating organic wastewater.

2. Description of the Prior Art

In general, sources of water pollution include household wastewater, business wastewater, livestock wastewater, etc. Since water pollution will damage the ecology and threaten human health, wastewater needs to be treated before being discharged.

Taking organic wastewater as an example, it has been proven that advanced oxidation processes (AOPs) can effectively remove organics which are difficultly decomposed by biology. The AOPs are usually carried out under normal temperature and normal pressure. The hydroxyl radical (·OH) generated in the AOPs can effectively remove organics in water to achieve the purpose of water purification. The water treatment composition used in the AOPs includes a catalytic material and an oxidant. The first generation catalytic materials are powders with catalytic activity. However, powders have small particle sizes and tend to suspend in water, such that it is difficult to separate the powders from water. In order to solve the aforementioned drawback, the second generation catalytic material has been developed. The second generation catalytic material is a composite material composed of a porous carrier and powders with catalytic activity, wherein the powders are attached on the porous carrier. However, in the process of degrading organics, the powders may falloff from the porous carrier. On one hand, the powders falling into the water will cause secondary pollution. On the other hand, the catalytic effect provided by the catalytic material is reduced due to the loss of the powders, which is unfavorable for reuse.

SUMMARY OF THE INVENTION

According to one embodiment of the present disclosure, a water treatment composition for treating organic wastewater includes a bulk catalytic material and an oxidant. The bulk catalytic material includes iron atoms or ions, manganese atoms or ions, and magnesium atoms or ions.

According to another embodiment of the present disclosure, a water treatment method includes steps as follows. A water treatment composition is provided, wherein the water treatment composition includes a bulk catalytic material and an oxidant, the bulk catalytic material includes iron atoms or ions, manganese atoms or ions, and magnesium atoms or ions. The water treatment composition is mixed with organic wastewater to decompose organics in the organic wastewater.

These and other objectives of the present invention will no doubt become obvious to those of ordinary skill in the art after reading the following detailed description of the preferred embodiment that is illustrated in the various figures and drawings.

DETAILED DESCRIPTION

<Water Treatment Composition>

A water treatment composition for treating organic wastewater is provided, wherein the water treatment composition includes a bulk catalytic material and an oxidant. The bulk catalytic material includes iron atoms or ions, manganese atoms or ions, and magnesium atoms or ions. Thereby, the bulk catalytic material can be easily separated from the treated water. Furthermore, catalytic activity compositions of the bulk catalytic material can be prevented from dissolving into the water to cause secondary pollution, and it is favorable for reuse. In addition, the bulk catalytic material simultaneously includes the iron atoms or ions, the manganese atoms or ions, and the magnesium atoms or ions, and thus has excellent catalytic activity, which is favorable for decomposing organics in the organic wastewater.

Specifically, the organic wastewater refers to wastewater that includes organics. The organics may be, but are not limited to, aromatic compounds or heterocyclic compounds. The organic wastewater may be, but is not limited to, colored wastewater discharged from dyeing and finishing industry or semiconductor industry. A concentration of the organics in the organic wastewater may be 10 ppm to 1000 ppm. When the concentration of the organics in the organic wastewater is out of the aforementioned range, a pretreatment step can be conducted to make the concentration of organics in the aforementioned range. For example, the organic wastewater can be diluted with water or evaporated and condensed.

According to the aforementioned water treatment composition, the water treatment composition and the organic wastewater can be mixed to form a treatment solution. In the treatment solution, a concentration of the oxidant may be 0.01 g/mL to 0.3 g/mL, and a concentration of the bulk catalytic material may be 0.01 g/mL to 0.5 g/mL. Therefore, a ratio of the oxidant to the bulk catalytic material is proper, which is beneficial to decompose the organics in the organic wastewater. The oxidant may be, but is not limited to, hydrogen peroxide, ozone or sodium hypochlorite. Since the bulk catalytic material is substantially insoluble in water, the aforementioned concentration of the bulk catalytic material is a mass of the bulk catalytic material divided by a total volume of the liquid in the treatment solution.

The "bulk" used in the bulk catalytic material refers that the catalytic material of the present disclosure has a larger volume relative to powders. For example, the bulk catalytic material may refer to a catalytic material with a particle size greater than or equal to 5 mm. Thereby, the bulk catalytic material can be easily separated from the treated water when the water treatment is completed. Meanwhile the catalytic effect can be maintained. Preferably, a particle size of the bulk catalytic material may be 0.5 cm to 4 cm. The bulk catalytic material may have a regular or irregular shape. Since the bulk catalytic material may have an irregular shape, different lengths can be obtained when measured in different directions. The aforementioned particle size refers to the maximum length of the bulk catalytic material. The "catalytic material" in the bulk catalytic material refers to a material including catalytic active compositions. For example, the aforementioned catalytic active compositions can have catalytic ability in the AOPs and can enhance the reaction rate of the AOPs.

In the bulk catalytic material, a content of the iron atoms or ions may be 0.1 mg/g to 1 mg/g, a content of the manganese atoms or ions may be 0.1 mg/g to 1.5 mg/g, and a content of the magnesium atoms or ions may be 2 mg/g to 6 mg/g. The bulk catalytic material may be an alkaline material, and a pH value of the bulk catalytic material may be 10 to 12. Thereby, the catalytic activity of the bulk catalytic material can be further improved.

The bulk catalytic material may be an industrial waste. For example, the bulk catalytic material may be a waste stone material including iron atoms or ions, manganese atoms or ions and magnesium atoms or ions of steel industries, construction industries, semiconductor industries and wastewater treatment industries. For example, when the waste stone material of the construction industries is determined to include atoms or ions of the iron, manganese and magnesium by composition analysis, the waste stone material can be crushed and sieved to retain the waste stone material with a particle size greater than or equal to 5 mm. The crushed and sieved waste stone material can be directly used as the bulk catalytic material of the present disclosure. Thereby, the industrial waste can be reused, which is beneficial to circular economy. Moreover, compared with a composite material composed of a porous carrier and powders, when manufacturing the bulk catalytic material of the present disclosure, the step of attaching powders on a porous carrier is not required. Therefore, it is beneficial to simplify the process for manufacturing the bulk catalytic material.

<Water Treatment Method>

Figure 1:
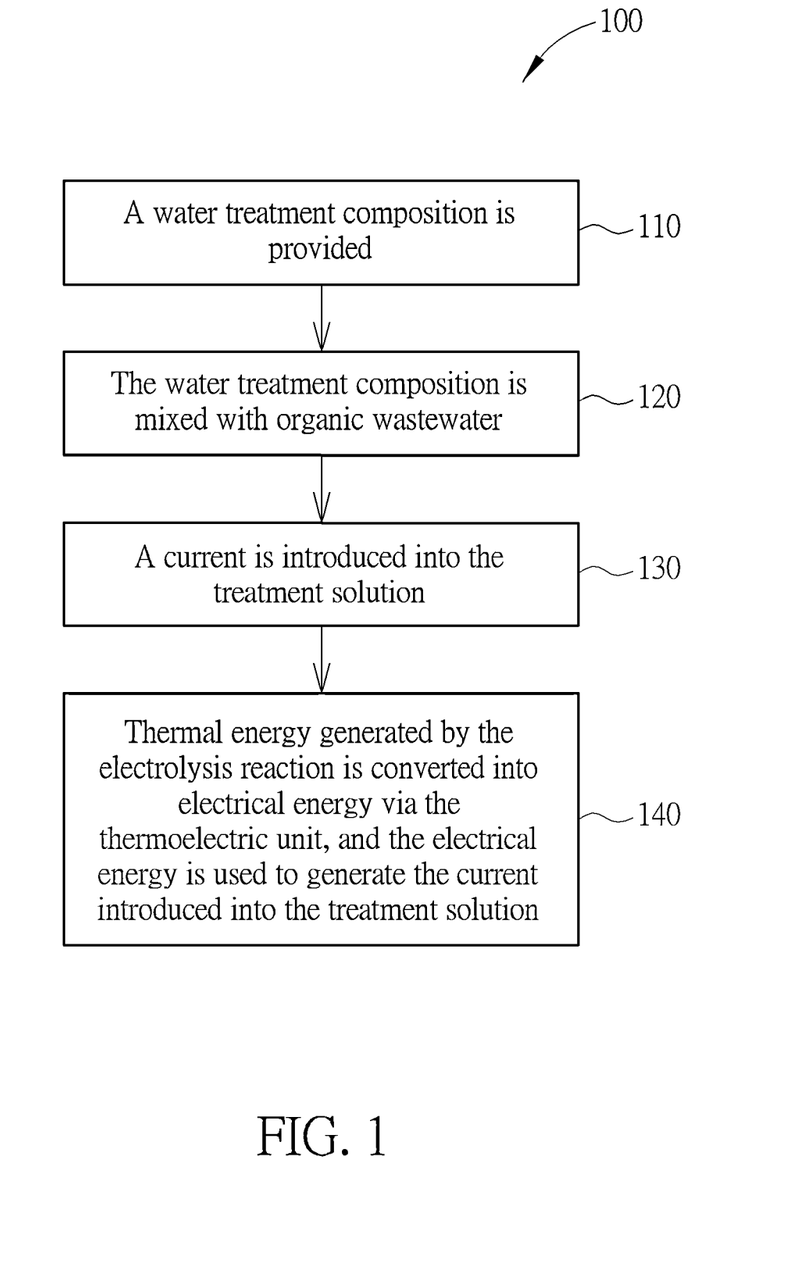
FIG. 1 is a flow diagram showing a water treatment method according to one embodiment of the present disclosure.

Please refer to FIG. 1, which is a flow diagram showing a water treatment method 100 according to one embodiment of the present disclosure. The water treatment method 100 includes Steps 110 and 120, and may selectively include Steps 130 and 140. In Step 110, a water treatment composition is provided. In Step 120, the water treatment composition is mixed with organic wastewater, so as to decompose organics in the organic wastewater. For details of the water treatment composition and the organic wastewater, references may be made to the aforementioned description and are omitted herein. In Step 130, a current is introduced into the treatment solution, so to cause the treatment solution to generate an electrolysis reaction. In Step 140, thermal energy generated by the electrolysis reaction is converted into electrical energy via the thermoelectric unit, and the electrical energy is used to generate the current introduced into the treatment solution.

Figure 2:
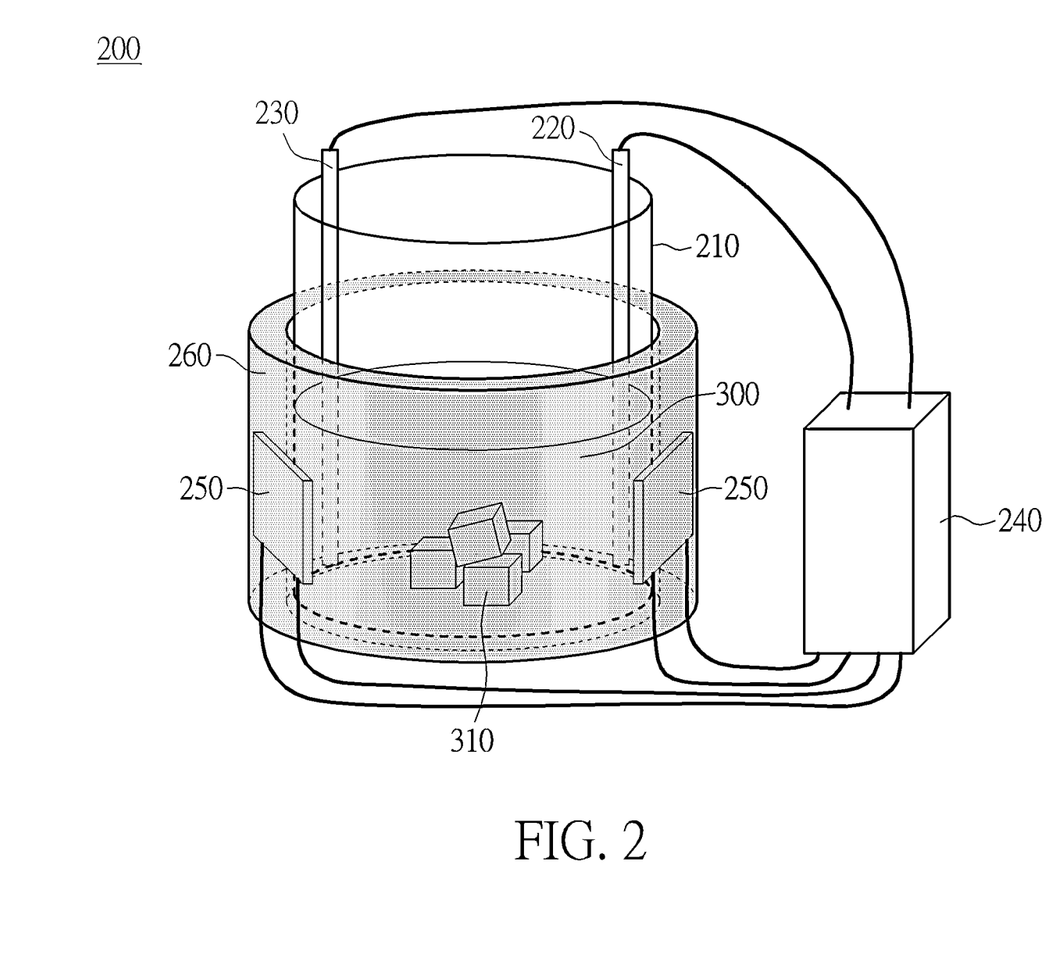
FIG. 2 is a schematic diagram showing a water treatment device according to one embodiment of the present disclosure.

Please refer to FIG. 2, which is a schematic diagram showing a water treatment device 200 according to one embodiment of the present disclosure. The water treatment device 200 includes a reaction container 210, two electrodes 220 and 230, a power management unit 240, and may selectively include at least one thermoelectric unit 250 and a thermal insulation layer 260. The power management unit 240 is electrically connected with the two electrodes 220 and 230 and the thermoelectric units 250, and can provide electrical energy to the two electrodes 220 and 230, receive the electrical energy of the thermoelectric units 250, and transmit the electrical energy of the thermoelectric units 250 to the two electrodes 220 and 230. The thermoelectric units 250 are attached to an outer surface of the reaction container 210. The thermoelectric units 250 can be thermoelectric chips. Herein, the number of the thermoelectric units 250 is two, which is only exemplary. The thermal insulation layer 260 wraps the reaction container 210 and the thermoelectric unit 250. The thermal insulation layer 260 may be thermal insulation cotton. When the water treatment is conducted, the water treatment composition and the organic wastewater are mixed to form a treatment solution 300. The water treatment composition includes a bulk catalytic material 310 and an oxidant (not shown). Herein, the shape of the bulk catalytic material 310 is cubic, which is only exemplary. The oxidant is dissolved in the organic wastewater. The power management unit 240 may introduce current into the treatment solution 300 through the two electrodes 220 and 230, so as to cause the treatment solution 300 to generate an electrolysis reaction (Step 130). Thereby, the effect of degrading organics can be further improved. Since the electrolysis reaction is an exothermic reaction, the thermal energy generated by the electrolysis reaction can be converted into electrical energy via the thermoelectric units 250, and the electrical energy can be transmitted to the power management unit 240. Then the power management unit 240 can use the electrical energy to generate the current and introduce the current into the treatment solution 300 through the two electrodes 220 and 230 (Step 140). Thereby, the thermal energy generated by the electrolysis reaction can be used as the electric energy required by the electrolysis reaction. The waste heat can be effectively utilized, and the cost of water treatment can be reduced.

Examples and Comparative Examples

Figure 3:
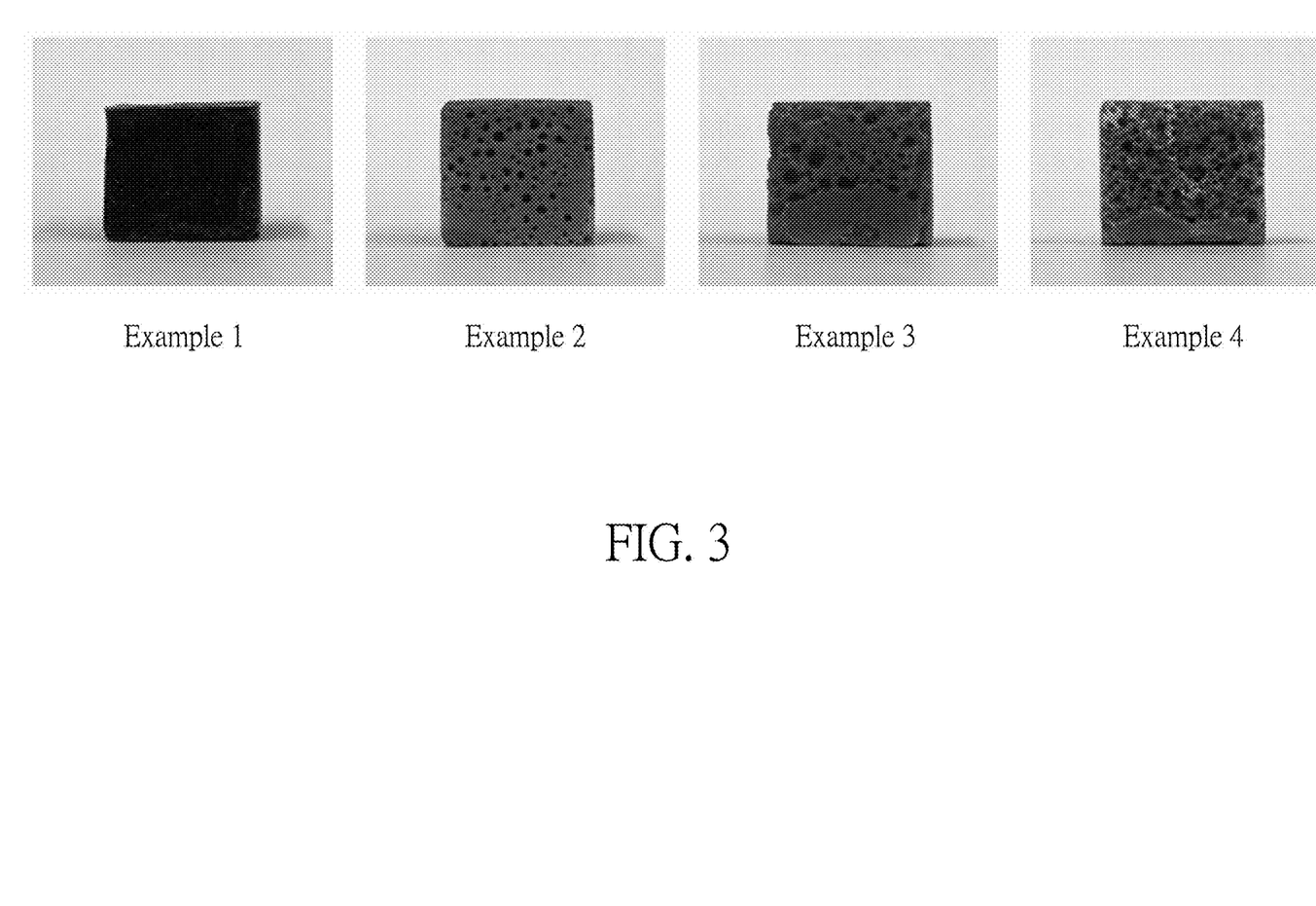
FIG. 3 shows appearances of bulk catalytic materials of Examples 1 to 4.

Please refer to FIG. 3, which shows appearances of bulk catalytic materials of Examples 1 to 4. The bulk catalytic materials of Examples 1 to 4 are waste stone materials of the construction industry, wherein Example 1 is a waste cement brick, and Examples 2 to 4 are waste concrete bricks. The aforementioned waste stone materials are cut into cubes with a side length of 1 cm to form the bulk catalytic materials of Examples 1 to 4.

The bulk catalytic materials of Examples 1 to 4 are subjected to property measurement experiments, including properties of pH value, density and BET specific surface area. The results are shown in Table 1. The measurement method of the pH value is as follows. Each of the bulk catalytic materials is immersed in an aqueous solution, and the pH value of the aqueous solution is measured by a pH meter. The measurement method of the density is as follows. A mass and a volume of each of the bulk catalytic materials are measured, and the mass is divided by the volume to obtain the density. The measurement method of the BET specific surface area is to use a specific surface area analyzer to analyze the specific surface area of each of the bulk catalytic materials.

TABLE 1

|  | Example 1 | Example 2 | Example 3 | Example 4 |
|---|---|---|---|---|
| pH value | 10.22 | 11.46 | 10.95 | 11.11 |
| Density (g/cm$^3$) | 1.73 | 0.81 | 0.68 | 0.52 |
| BET specific surface (m$^2$/g) | 0.49 | 0.67 | 2.06 | 8.45 |

Figure 4:
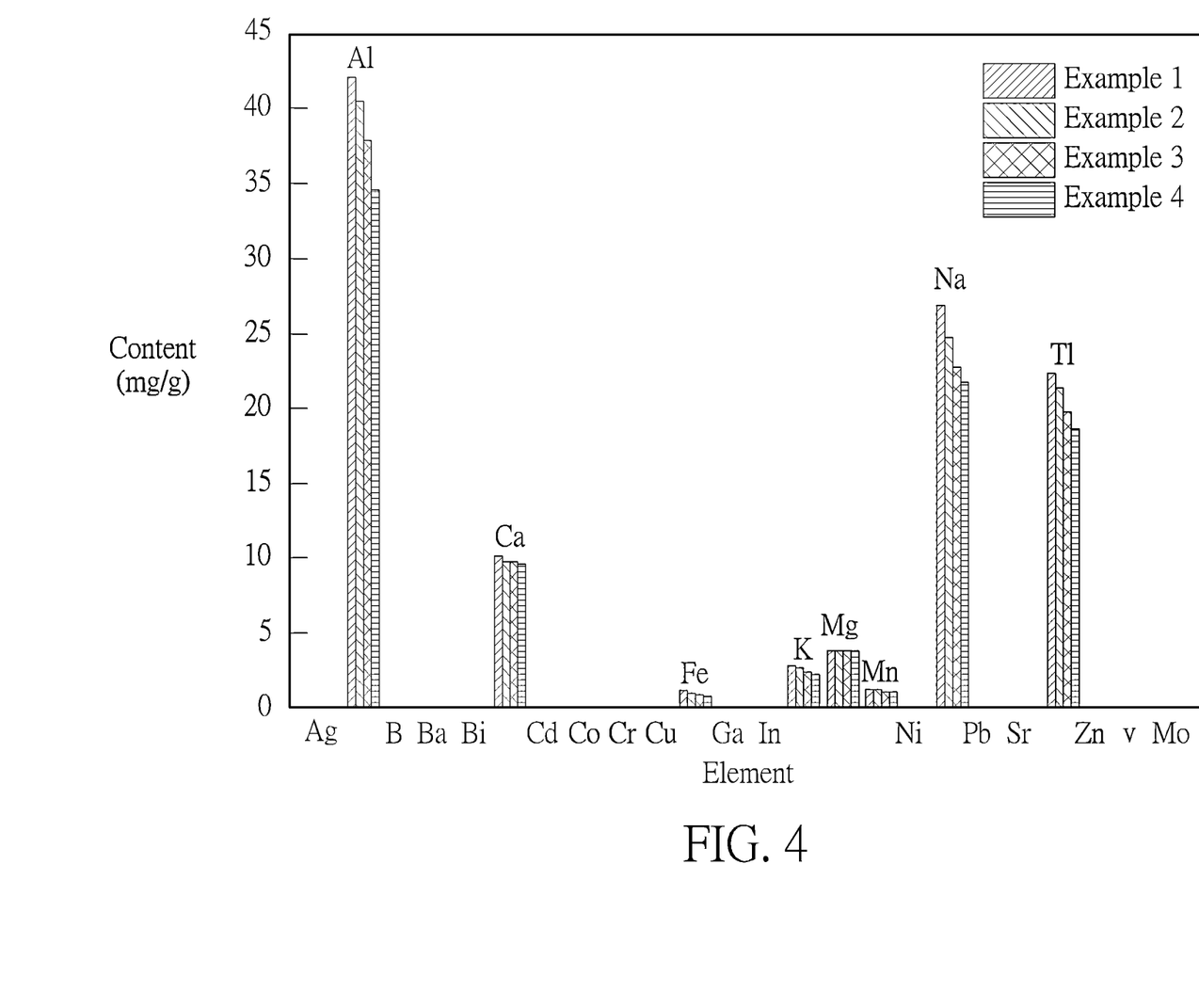
FIG. 4 shows composition analysis results of the bulk catalytic materials of Examples 1 to 4.

The bulk catalytic materials of Examples 1 to 4 are subjected to a composition analysis experiment, which is carried out by using an inductively coupled plasma mass spectrometry (ICP-MS). Please refer to FIG. 4, which shows composition analysis results of the bulk catalytic materials of Examples 1 to 4. As shown in FIG. 4, the bulk catalytic materials of Examples 1 to 4 include elements of aluminum (Al), calcium (Ca), iron (Fe), potassium (K), magnesium (Mg), manganese (Mn), sodium (Na), thallium (Tl), etc. The elements exist in the bulk catalytic materials in the form of atoms or ions, wherein the three elements, Fe, Mg, and Mn, have catalytic activity. A content of the iron atoms or ions is 0.1 mg/g to 1 mg/g, a content of the manganese atoms or ions is 0.1 mg/g to 1.5 mg/g, and a content of the magnesium atoms or ions is 2 mg/g to 6 mg/g.

Figure 5:
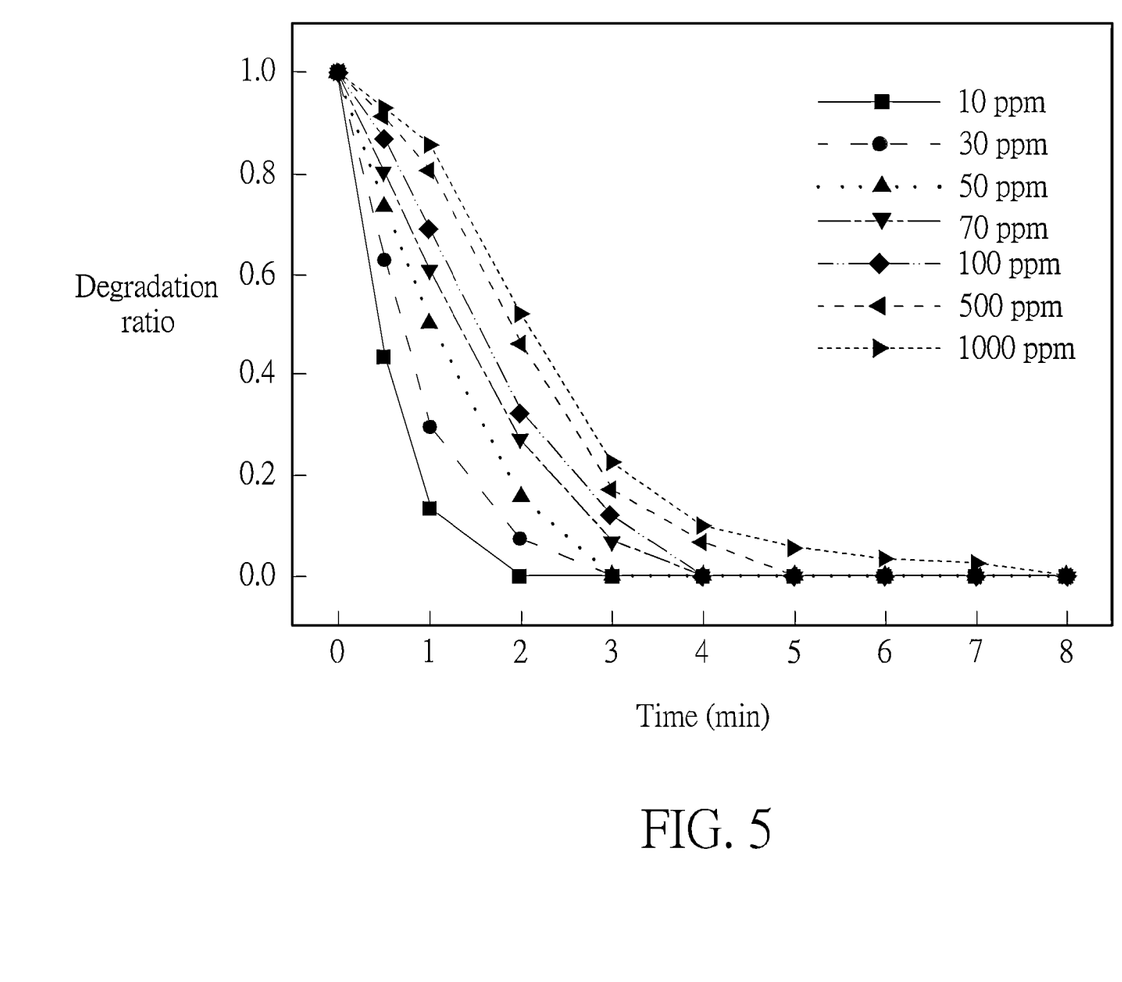
FIG. 5 shows results of the bulk catalytic material of Example 4 cooperated with the oxidant for degrading methylene blue (MB) solutions with different concentrations.

The bulk catalytic material of Example 4 is cooperated with an oxidant to conduct an organics degradation experiment, in which 1.5 g bulk catalytic material and 3.625 g, 35% hydrogen peroxide are put into 2.5 mL methylene blue (MB) solutions with concentrations of 10 ppm, 30 ppm, 50 ppm, 70 ppm, 100 ppm, 500 ppm and 1000 ppm, respectively. The degradation ratio of the MB solution is measured every 1 minute. The degradation ratio is C/CO, wherein CO is the initial concentration of the MB solution, and C is the concentration of the MB solution after degradation. In the organics degradation experiment, the concentration of the bulk catalytic material is calculated by dividing the mass of the bulk catalytic material (herein, 1.5 g) by the total volume of the liquid in the treatment solution (herein, the total volume of hydrogen peroxide and the MB solution). Please refer to FIG. 5, which shows results of the bulk catalytic material of Example 4 cooperated with the oxidant for degrading the MB solutions with different concentrations. As shown in FIG. 5, the bulk catalytic material of the present disclosure cooperated with the oxidant show excellent degradation effect for the MB solutions with concentrations of 10 ppm to 1000 ppm. Moreover, the MB solutions can be completely degraded within 8 minutes.

Figure 6:
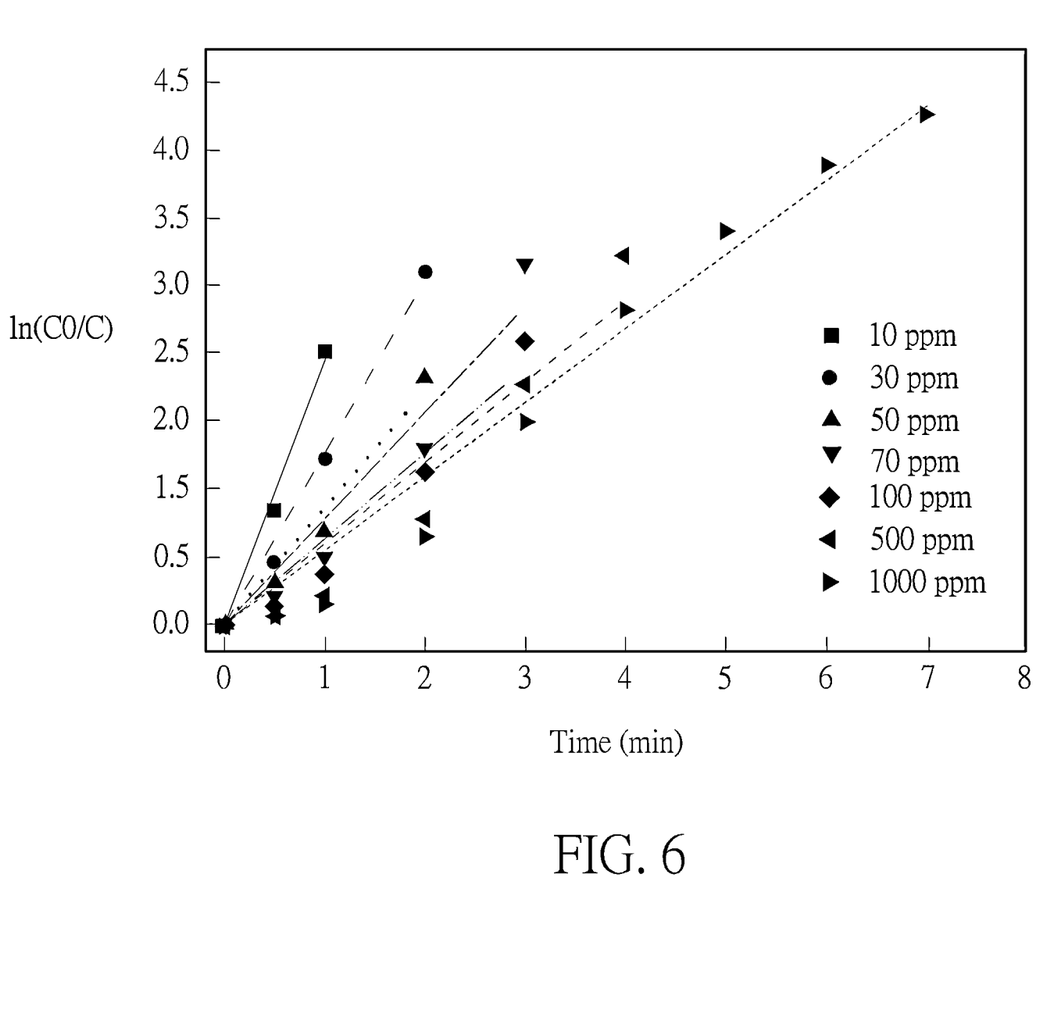
FIG. 6 shows results of rate constant (K value) of the bulk catalytic material of Example 4 cooperated with the oxidant for degrading MB solutions with different concentrations.

Please refer to FIG. 6, which shows results of rate constant (K value) of the bulk catalytic material of Example 4 cooperated with the oxidant for degrading the MB solutions with different concentrations. The K value is calculated as follows: ln(CO/C)=Kt. The definitions of CO and C are as above, and t represents time. Therefore, the slope of each line in FIG. 6 represents the K value of the concentration, and the K values are listed in Table 2. As shown in Table 2, the K values of Example 4 for degrading the MB solutions with concentrations of 10 ppm to 1000 ppm are in the range of 0.62 min-1 to 2.01 min$^{-1}$.

TABLE 2

|  | Concentration of MB solution (ppm) | | | |
|---|---|---|---|---|
|  | 10 | 30 | 50 | 70 |
| K value (min$^{-1}$) | 2.01 | 1.30 | 1.16 | 0.99 |
| Concentration of MB solution (ppm) | 100 | 500 | 1000 | |
| K value (min$^{-1}$) | 0.74 | 0.71 | 0.62 | |

Figure 7:
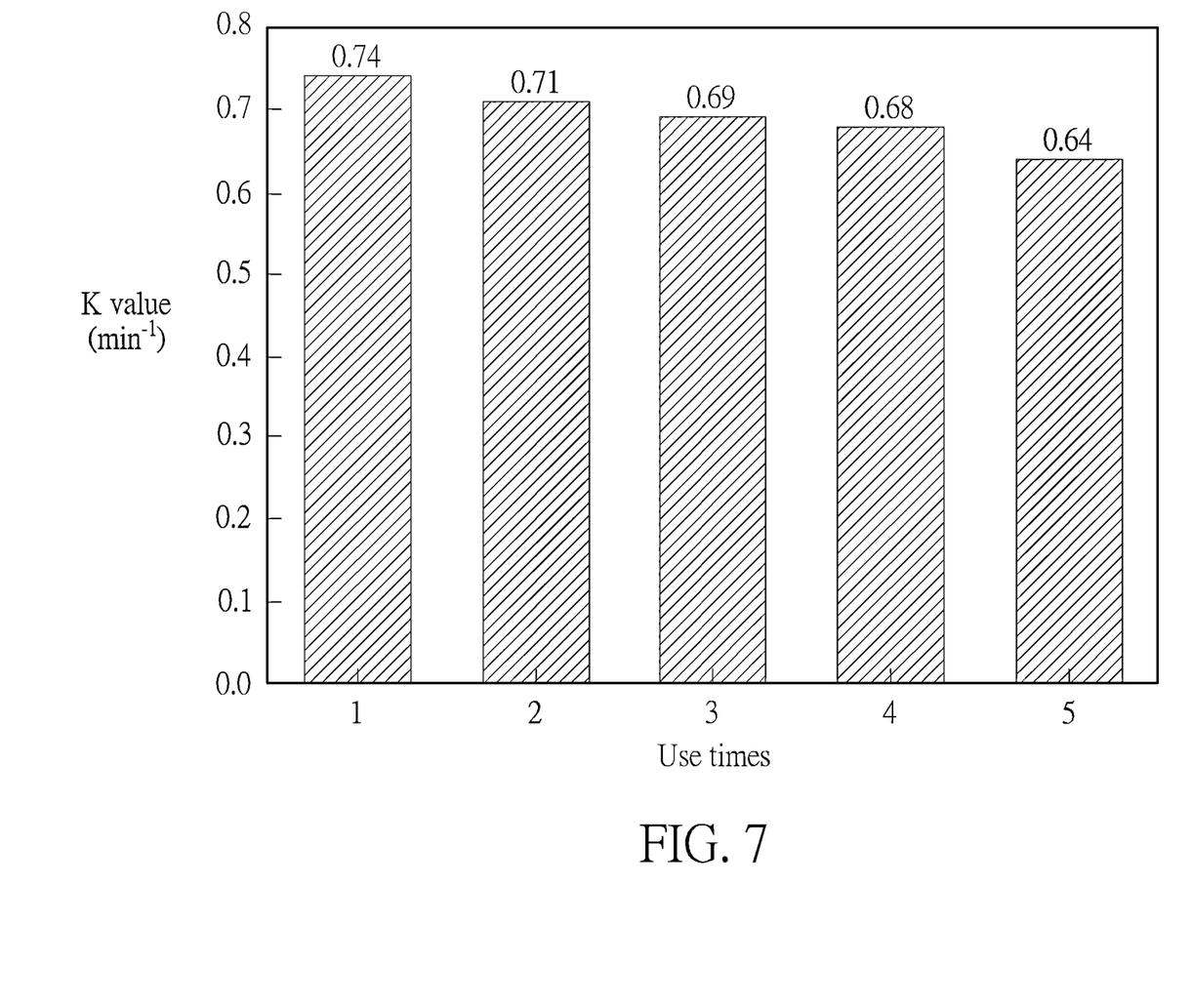
FIG. 7 shows relationships of K values and use times of the bulk catalytic material of Example 4 cooperated with the oxidant for organics degradation experiments.
Figure 8:
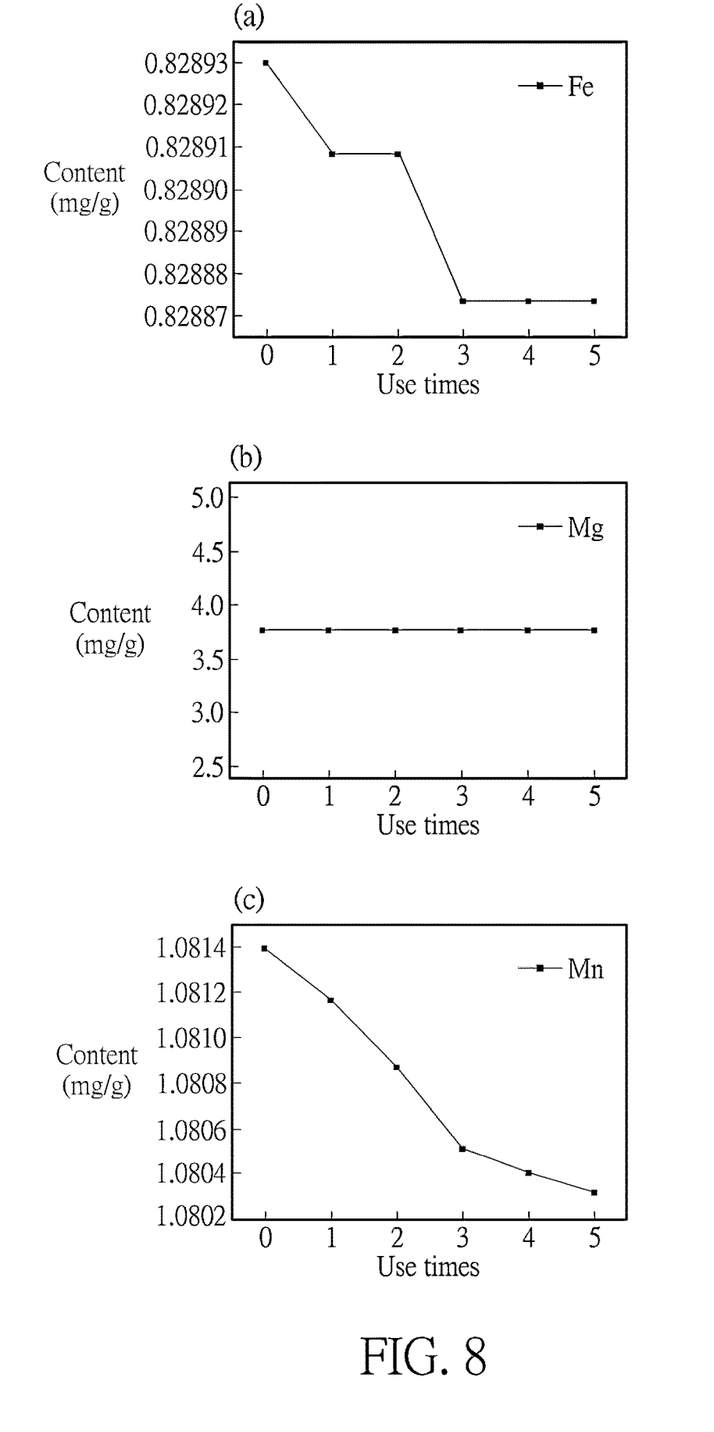
FIG. 8 shows relationships of the contents of atoms or ions of iron, magnesium and manganese and use times.

The bulk catalytic material of Example 4 is cooperated with the oxidant to repeatedly conduct the organics degradation experiments, the K value of each of the degradation experiments is calculated, and the contents of atoms or ions of iron, magnesium and manganese are measured. Please refer to FIG. 7, which shows relationships of K values and use times of the bulk catalytic material of Example 4 cooperated with the oxidant for the organics degradation experiments. When the bulk catalytic material of Example 4 is used for the first time, the K value is 0.74 min$^{-1}$. When the bulk catalytic material of Example 4 is used for the fifth time, the K value is still as high as 0.64 min$^{-1}$. Please refer to FIG. 8, wherein (a), (b), and (c) portions respectively show relationships of the contents of atoms or ions of iron, magnesium, and manganese and the use times. As shown in FIG. 8, the contents of the atoms or ions of iron and manganese decrease slightly after use, showing that the atoms or ions of iron and manganese dissolve into water during the degradation process. However, the decrease amount is very small, wherein after five uses, the decrease amount of atoms or ions of iron is less than 0.00006 mg per gram of the bulk catalytic material, and the decrease amount of atoms or ions of manganese is less than 0.001 mg per gram of the bulk catalytic material. As shown in FIG. 7 and FIG. 8, the active catalytic compositions of the bulk catalytic material according to the present disclosure do not easily dissolve into water to cause secondary pollution during the degradation process, and is favorable for reuse.

The bulk catalytic materials of Examples 1 to 4 are cooperated with the oxidant to conduct organics degradation experiments, in which 1.5 g bulk catalytic materials of Examples 1 to 4 and 3.625 g, 35% hydrogen peroxide are put into 2.5 mL, 10 ppm MB solutions, respectively. The degradation ratio of the MB solution is measured every 1 minute, and the K value is calculated. The results are listed in Table 3. For the calculation method of degradation ratio and K value are as above.

TABLE 3

| Example | 1 | 2 | 3 | 4 |
|---|---|---|---|---|
| K value (min$^{-1}$) | 0.50 | 0.87 | 1.51 | 2.01 |

As shown in Table 3, when the BET specific surface area is larger, the K value is larger. Preferably, the BET specific surface area of the bulk catalytic material is greater than or equal to 0.6 m$^2$/g, which is beneficial to improve the degradation efficiency.

Figure 9:
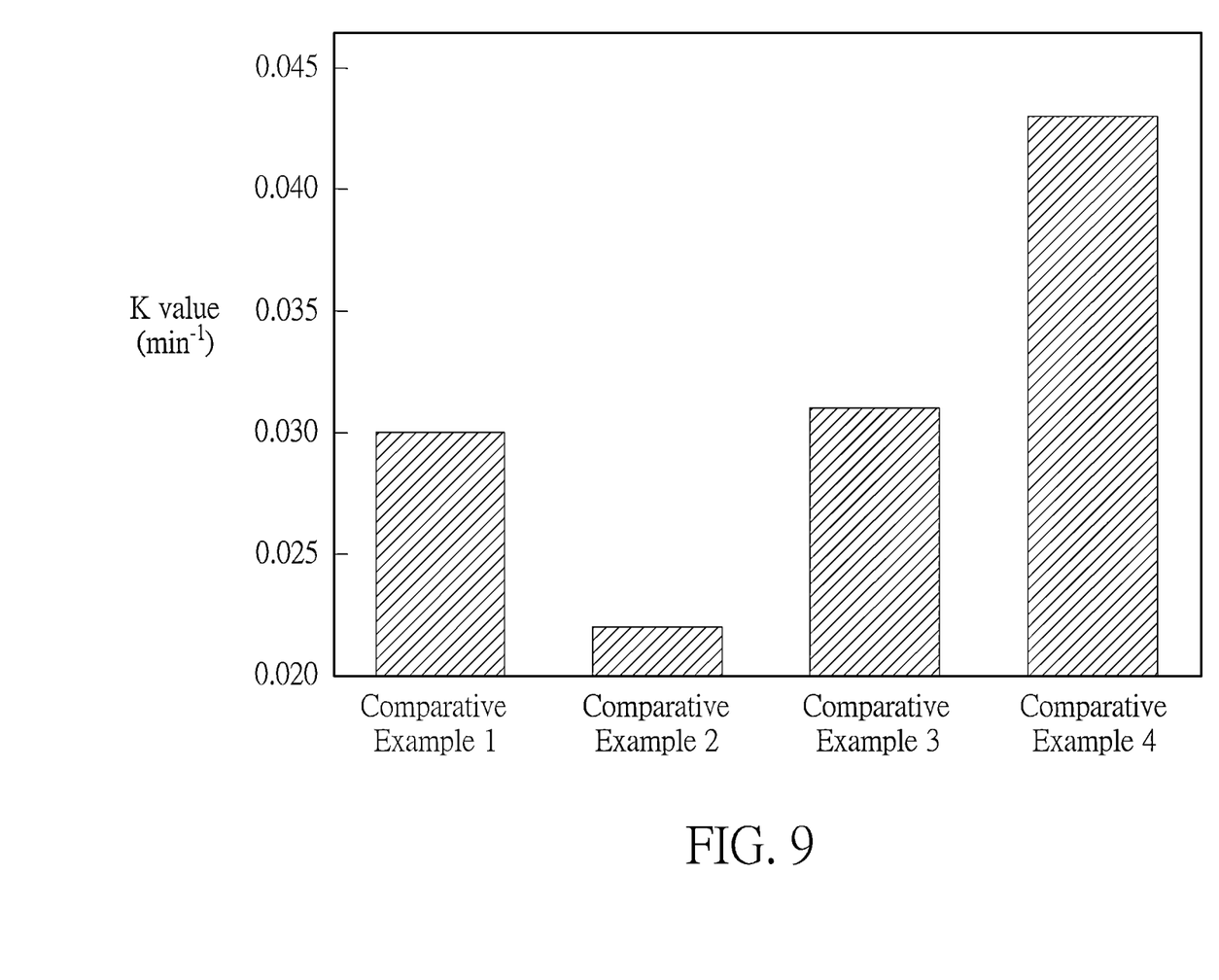
FIG. 9 shows K values of comparative Examples 1 to 4.

The catalytic materials of Comparative Examples 1 to 4 are prepared, wherein the catalytic material of Comparative Example 1 includes 0.00098 grams of iron (II, III) oxide (Fe$_3$O$_4$) and 0.00044 grams of manganese dioxide (MnO$_2$), the catalytic material of Comparative Example 2 includes 0.00098 grams of iron (II, III) oxide and 0.00017 grams of magnesium oxide (MgO), the catalytic material of Comparative Example 3 includes 0.00017 grams of magnesium oxide and 0.00044 grams of manganese dioxide, and the catalytic material of Comparative Example 4 includes 0.00066 grams of iron (II, III) oxide, 0.00029 grams of manganese dioxide and 0.00011 grams of magnesium oxide. The catalytic materials of Comparative Examples 1 to 4 and hydrogen peroxide are respectively put into 100 ppm MB solutions to form treatment solutions. In the treatment solutions, the concentrations of the catalytic materials are 0.00012 g/mL to 0.00028 g/mL, and the concentration of the hydrogen peroxide is 0.254 g/mL. The degradation ratio of the MB solution after 15 minutes is measured, and then the K value is calculated. Please refer to FIG. 9, which shows K values of comparative Examples 1 to 4. As shown in FIG. 9, compared with the catalytic material that only includes any two kinds of the iron ions, the manganese ions and the magnesium ions, the catalytic material simultaneously includes the iron ions, the manganese ions and the magnesium ions can have a larger K value when other conditions are the same. When the K value is larger, the reaction rate is faster. That is, the catalytic material has a larger catalytic activity. Although the catalytic materials of Comparative Examples 1 to 4 are powders rather than bulk catalytic materials, FIG. 9 shows that the present disclosure can provide better catalytic activity by the bulk catalytic material simultaneously including the atoms or ions of iron, manganese and magnesium.

Compared with the prior art, the catalytic material of the present disclosure is a bulk catalytic material. It is favorable for being separated from the treated water than powders. Compared with the composite material composed of a porous carrier and powders, it can avoid secondary pollution and the drawbacks of unfavorable for reuse caused by the powders falling off from the porous carrier. The bulk catalytic material of the present disclosure has excellent catalytic activity by simultaneously including the iron atoms or ions, the manganese atoms or ions and the magnesium atoms or ions, which is beneficial to decomposing organics in organic wastewater.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A water treatment composition for treating organic wastewater, the water treatment composition comprising:
   a bulk catalytic material, comprising iron atoms or ions, manganese atoms or ions, and magnesium atoms or ions, wherein in the bulk catalytic material, a content of the iron atoms or ions is 0.1 mg/g to 1 mg/g, a content of the manganese atoms or ions is 0.1 mg/g to 1.5 mg/g, and a content of the magnesium atoms or ions is 2 mg/g to 6 mg/g; and
   an oxidant.

2. The water treatment composition of claim 1, wherein a particle size of the bulk catalytic material is 0.5 cm to 4 cm.

3. The water treatment composition of claim 1, wherein a concentration of organics in the organic wastewater is 10 ppm to 1000 ppm.

4. The water treatment composition of claim 1, wherein the water treatment composition and the organic wastewater are mixed to form a treatment solution, in the treatment solution, a concentration of the oxidant is 0.01 g/mL to 0.3 g/mL, and a concentration of the bulk catalytic material is 0.01 g/mL to 0.5 g/mL.

5. The water treatment composition of claim 1, wherein the oxidant is hydrogen peroxide, ozone or sodium hypochlorite.

6. The water treatment composition of claim 1, wherein the bulk catalytic material is an industrial waste.

7. A water treatment method, comprising:
   providing a water treatment composition, wherein the water treatment composition comprises a bulk catalytic material and an oxidant, the bulk catalytic material comprises iron atoms or ions, manganese atoms or ions, and magnesium atoms or ions, in the bulk catalytic material, a content of the iron atoms or ions is 0.1 mg/g to 1 mg/g, a content of the manganese atoms or ions is 0.1 mg/g to 1.5 mg/g, and a content of the magnesium atoms or ions is 2 mg/g to 6 mg/g; and
   mixing the water treatment composition with organic wastewater, so as to decompose organics in the organic wastewater.

8. The water treatment method of claim 7, wherein the water treatment composition and the organic wastewater form a treatment solution, and the water treatment method further comprises:
   introducing a current into the treatment solution, so as to cause the treatment solution to generate an electrolysis reaction.

9. The water treatment method of claim 8, further comprising:
   converting thermal energy generated by the electrolysis reaction into electrical energy via a thermoelectric unit, and using the electrical energy to generate the current introduced into the treatment solution.

* * * * *